US012680700B2

(12) United States Patent
Bruckbauer

(10) Patent No.: US 12,680,700 B2
(45) Date of Patent: Jul. 14, 2026

(54) HOB WITH CENTRAL DOWNWARD REMOVAL OF COOKING VAPORS THROUGH SUCTION

(71) Applicant: Wilhelm Bruckbauer, Neubeuern (DE)

(72) Inventor: Wilhelm Bruckbauer, Neubeuern (DE)

(73) Assignee: Werkhaus GmbH & Co. KG (DE)

( * ) Notice: Subject to any disclaimer, the term of this patent is extended or adjusted under 35 U.S.C. 154(b) by 578 days.

(21) Appl. No.: 18/103,615

(22) Filed: Jan. 31, 2023

(65) Prior Publication Data

US 2023/0184442 A1 Jun. 15, 2023

Related U.S. Application Data

(63) Continuation of application No. 16/907,628, filed on Jun. 22, 2020, now Pat. No. 11,592,188, which is a (Continued)

(30) Foreign Application Priority Data

Apr. 28, 2011 (DE) ..................... 20 2011 005 698.8

(51) Int. Cl.
*F24C 15/20* (2006.01)
*F24C 15/32* (2006.01)

(52) U.S. Cl.
CPC .......... *F24C 15/2042* (2013.01); *F24C 15/20* (2013.01); *F24C 15/2035* (2013.01); (Continued)

(58) Field of Classification Search
CPC ..... F04D 19/002; F24C 15/2042; F24C 15/20
See application file for complete search history.

(56) References Cited

U.S. PATENT DOCUMENTS 2,674,991 A * 4/1954 Schaefer ............. F24C 15/2085 126/299 R
3,109,358 A 11/1963 Meyer
(Continued)

FOREIGN PATENT DOCUMENTS

CA 2081823 A1 11/1992
CA 2056695 † 5/1993
(Continued)

OTHER PUBLICATIONS

Affidavit from Mr. Geoffrey Baker.
(Continued)

*Primary Examiner* — Jorge A Pereiro
(74) *Attorney, Agent, or Firm* — POLSINELLI PC

(57) ABSTRACT

A hob (1) with one or more cooking locations (2), which, as viewed from above, exhibits one or more recesses (4) only in the area (25) around its geometric center (3), which are respectively connected with one or more devices (5) for removing cooking vapors through suction. These devices (5) for removing cooking vapors through suction downwardly remove the cooking vapors that arise above the cooking locations (2) by suction in a direction vertically below the hob (1), and such a hob (1), which in the assembly unit is designed with a device (36) for operating the hob (2) and downwardly removing cooking vapors by suction.

19 Claims, 17 Drawing Sheets

Related U.S. Application Data continuation of application No. 15/988,237, filed on May 24, 2018, now Pat. No. 10,718,528, which is a continuation of application No. 14/114,351, filed as application No. PCT/DE2012/000458 on Apr. 28, 2012, now Pat. No. 10,006,641.

(52) U.S. Cl.

CPC .......... *F24C 15/322* (2013.01); *F24C 15/325* (2013.01); *B08B 2215/006* (2013.01)

(56) References Cited

U.S. PATENT DOCUMENTS

| | | | | | |
|---|---|---|---|---|---|
| 3,233,606 | A | | 2/1966 | Robert et al. | |
| 3,367,320 | A | † | 2/1968 | Jenn et al. | |
| 3,409,005 | A | | 11/1968 | Field | |
| 3,587,555 | A | * | 6/1971 | Cerola | F24C 15/2042 219/400 |
| 3,596,650 | A | | 8/1971 | Cerola | |
| 3,606,740 | A | * | 9/1971 | Ballennie | B01D 46/023 55/501 |
| 3,710,948 | A | * | 1/1973 | Sexton | B01D 46/02 55/382 |
| 3,797,375 | A | * | 3/1974 | Cerola | F24C 15/2042 99/422 |
| 4,071,739 | A | | 1/1978 | Jenn et al. | |
| 4,409,954 | A | * | 10/1983 | Berlik | F24C 3/103 126/39 M |
| 4,411,254 | A | * | 10/1983 | Field | F24C 15/2042 126/300 |
| 4,415,788 | A | * | 11/1983 | Field | H05B 6/1263 219/452.12 |
| 4,431,892 | A | | 2/1984 | White | |
| 4,446,849 | A | † | 5/1984 | Mc Farland | |
| 4,501,260 | A | | 2/1985 | Grace | |
| 4,562,827 | A | | 1/1986 | Cerola | |
| 4,665,893 | A | | 5/1987 | Miyagawa et al. | |
| 4,705,018 | A | * | 11/1987 | Beach | F24C 3/126 126/39 N |
| 4,750,470 | A | * | 6/1988 | Beach | F24C 15/2042 126/300 |
| 4,846,146 | A | | 7/1989 | Tucker et al. | |
| 4,889,104 | A | | 12/1989 | Gostelow | |
| 4,899,028 | A | | 2/1990 | Arai et al. | |
| 5,001,970 | A | | 3/1991 | Graver | |
| 5,078,122 | A | * | 1/1992 | Kalenian | A47J 37/06 126/299 C |
| 5,133,786 | A | | 7/1992 | Anderson | |
| 5,190,026 | A | | 3/1993 | Doty | |
| 5,209,217 | A | * | 5/1993 | Beach | F24C 3/126 126/300 |
| 5,231,972 | A | † | 8/1993 | Galassi | |
| 5,269,824 | A | * | 12/1993 | Takita | B01D 46/2403 55/497 |
| 5,279,279 | A | | 1/1994 | White | |
| 5,301,653 | A | * | 4/1994 | Gerdes | F24C 15/2042 D7/346 |
| 5,325,842 | A | | 7/1994 | Beach et al. | |
| 5,619,982 | A | | 4/1997 | Kelly et al. | |
| 5,738,083 | A | * | 4/1998 | Pettinari | F24C 15/20 454/67 |
| 5,797,512 | A | * | 8/1998 | Boland | B65F 1/06 220/495.08 |
| 5,800,585 | A | * | 9/1998 | Choi | B01D 46/06 55/525 |
| 5,884,619 | A | * | 3/1999 | Terry | F24C 15/2042 126/299 D |
| 5,954,221 | A | * | 9/1999 | Boland | B65F 1/0006 220/495.08 |
| 5,962,410 | A | † | 10/1999 | Jaynes | |
| 6,455,818 | B1 | * | 9/2002 | Arntz | F24C 15/2042 126/299 R |
| 6,575,157 | B1 | † | 6/2003 | Shaver | |
| 6,916,353 | B2 | | 7/2005 | Tang | |
| 7,002,110 | B2 | | 2/2006 | Satou et al. | |
| 7,069,923 | B2 | | 7/2006 | Seong | |
| 2005/0088128 | A1 | * | 4/2005 | Seong | H02P 25/18 318/452 |
| 2005/0167415 | A1 | | 8/2005 | Satou et al. | |
| 2005/0188983 | A1 | | 9/2005 | Grandpierre | |
| 2006/0150965 | A1 | | 7/2006 | Kim et al. | |
| 2007/0023420 | A1 | * | 2/2007 | Gagas | H05B 6/1263 219/623 |
| 2007/0062513 | A1 | * | 3/2007 | Gagas | G01G 3/16 126/299 D |
| 2007/0062514 | A1 | | 3/2007 | Ota | |
| 2007/0151067 | A1 | | 7/2007 | Cheng | |
| 2009/0123285 | A1 | * | 5/2009 | Sinzaki | F04D 29/281 416/178 |
| 2010/0116263 | A1 | * | 5/2010 | Bruckbauer | F24C 15/2071 126/299 D |
| 2010/0163549 | A1 | * | 7/2010 | Gagas | F24C 15/2042 219/622 |
| 2011/0132900 | A1 | | 6/2011 | Kinoshita et al. | |
| 2011/0146657 | A1 | † | 6/2011 | Briedis | |
| 2012/0204855 | A1 | | 8/2012 | Huber | |
| 2014/0048057 | A1 | | 2/2014 | Bruckbauer | |

FOREIGN PATENT DOCUMENTS

| | | | | | |
|---|---|---|---|---|---|
| CN | 2310522 | Y | | 3/1999 | |
| CN | 2851909 | Y | | 12/2006 | |
| CN | 201315818 | Y | | 9/2009 | |
| CN | 101694306 | A | | 4/2010 | |
| CN | 201569025 | U | | 9/2010 | |
| DE | 1579679 | A1 | | 8/1970 | |
| DE | 3718134 | A1 | | 12/1987 | |
| DE | 3741721 | A1 | | 6/1988 | |
| DE | 43 39 877 | A1 | | 5/1995 | |
| DE | 202005010164 | U1 | * | 9/2005 | F24C 15/2042 |
| DE | 102005030038 | A1 | | 12/2006 | |
| DE | 202007003135 | U1 | * | 6/2007 | B01D 46/30 |
| DE | 202007017325 | U1 | | 3/2008 | |
| DE | 102007002241 | A1 | | 7/2008 | |
| DE | 202008013350 | U1 | | 1/2009 | |
| DE | 20200900828 | U | | 9/2009 | |
| DE | 202009008286 | U1 | * | 9/2009 | F24C 15/2042 |
| DE | 102008050723 | A1 | | 4/2010 | |
| DE | 102009025038 | A1 | | 12/2010 | |
| DE | 202011001401 | U1 | | 4/2011 | |
| DE | 202011005698 | U1 | | 9/2011 | |
| DE | 202011104408 | U1 | | 11/2011 | |
| DE | 202011109570 | U1 | | 3/2012 | |
| DE | 202012013574 | U1 | | 12/2017 | |
| DE | 102020202599 | A1 | | 9/2021 | |
| EP | 1680997 | A2 | | 7/2006 | |
| EP | 1944553 | A2 | | 7/2008 | |
| EP | 1944553 | B1 | | 11/2010 | |
| EP | 2444739 | A2 | | 4/2012 | |
| EP | 2975327 | A1 | | 1/2016 | |
| EP | 3282197 | A1 | | 2/2018 | |
| EP | 3287702 | A1 | | 2/2018 | |
| EP | 3828469 | A1 | | 6/2021 | |
| EP | 3869107 | A1 | | 8/2021 | |
| FR | 2726752 | A1 | | 5/1996 | |
| GB | 1232982 | A | | 5/1971 | |
| GB | 2263334 | A | | 7/1993 | |
| JP | S58178989 | A | | 10/1983 | |
| JP | S63294423 | A | | 12/1988 | |
| JP | H04240317 | A | | 8/1992 | |
| JP | 04309738 | A | * | 11/1992 | |
| JP | H07236574 | A | | 9/1995 | |
| JP | H0970360 | A | | 3/1997 | |
| JP | 09148061 | A | * | 6/1997 | |
| JP | 2000046391 | A | | 2/2000 | |
| JP | 2000070759 | A | | 3/2000 | |
| JP | 2000139720 | A | | 5/2000 | |
| JP | 2001029240 | A | | 2/2001 | |
| JP | 2001340227 | A | | 12/2001 | |
| JP | 2002033184 | A | * | 1/2002 | |
| JP | 2002085262 | A | | 3/2002 | |

(56) References Cited

FOREIGN PATENT DOCUMENTS

| | | | | |
|---|---|---|---|---|
| JP | 2003217814 | A | * | 7/2003 |
| JP | 2007003088 | A | | 1/2007 |
| KR | 20060082690 | A | | 7/2006 |
| KR | 20060087209 | A | | 8/2006 |
| RU | 2315242 | C2 | | 1/2008 |
| WO | 20051008631 | | † | 10/2005 |
| WO | 2007134500 | A1 | | 11/2007 |
| WO | 2008083660 | A2 | | 7/2008 |
| WO | 2010090369 | A1 | | 8/2010 |
| WO | 2012146237 | A1 | | 11/2012 |

OTHER PUBLICATIONS

Affidavit from Mrs. Paula Haines.
Dimension Guide for a KitchenAid Electric Downdraft Cooktop.
Exhibit A Relating to a Full Line Catalog of Appliances.
Exhibit A Relating to Sales Information.
Exhibit B Relating to Information Regarding Jenn-Air Cooktops.
Exhibit B Relating to Sales Information of Jenn-Air appliances.
Exhibit C Relating to a Sales Transaction.
Exhibit C Relating to Jenn-Air Training Portfolio Model Numbers.
Exhibit D Relating to a Full Line Catalog of Jenn-Air Appliances.
Exhibit D Relating to a Sales Transaction.
Exhibit E Relating to a Sale Check.
Exhibit E Relating to a Sears Sales Transaction.
Exhibit F Relating to a Sears Sales Transaction.
Exhibit G Relating to a Sears Sales Transaction.
Exhibit G Relating to a Slip-Sheet.
Installation Manual for a 30 inch Gas Downdraft Cooktop.
Installation Manual Relating to a Jenn-Air 30 inch and 36 inch Electric Downdraft Cooktop.
Operating Manual for a KitchenAid 30 inch and 36 inch Downdraft Radiant Cooktop.
Sales Documents Häcker Küchen.
Sales Documents Nolte Küchen.
Sales Documents Nobilia Küchen.
Sales Documents Miele Die Küchen.
Sales Documents Poggenpohl Küchen.
Sales Manual, Edition Sep. 2010.
Screenshot relating to a Jenn-Air 30 inch Electric Radiant Downdraft Cooktop.
Screenshot relating to a KitchenAid Architect Series Smoothtop Electric Cooktop.
Screenshots of a KitchenAid 4-burner Downdraft Cooktop.
Screenshots relating to a Jenn-Air 30 inch Electric Radiant Downdraft Cooktop.
Screenshots relating to a KitchenAid architect series 30-inch electric cooktop.
Screenshots relating to electric cooking on an island.
Screenshots relating to KitchenAid 4-burner downdraft cooktop.
Third Party Observation Document of Apr. 12, 2017.
Third Party Observation Document of Feb. 21, 2017.
Third Party Observation Document of Nov. 5, 2018.
Third Party Observation Document of Oct. 29, 2018.
Third Party Observation Document of Sep. 11, 2017.
WESCO uttenlüfter und Randabzugshauben Technik ohne Schnickschnack.
Operating Manual for a Gas Downdraft Cooktop.
Exhibit F relating to a Slip-Sheet.
Chinese Office Action of Mar. 21, 2019.
International Search Report for PCT/DE/2012/000458 dated Sep. 5, 2012.
Anonymous: "Blowers and Fans for Extractor Hoods Ebmpapst," Presentation EBM-PAPST, Sep. 15, 2005, pp. 1-31 (1 Page) XP055661646.
European Search Report for European Application No. 21168165.5, mailed Jul. 5, 2021, 4 Pages.
European Search Report for European Application No. 23165982.2, mailed Jul. 20, 2023, 5 Pages.
Extended European Search Report for European Application No. 15177616.8, mailed Oct. 8, 2015, 6 Pages.
Extended European Search Report for European Application No. 17184069.7, mailed Jan. 15, 2018, 9 Pages.
Extended European Search Report for European Application No. 17197091.6, mailed Jan. 15, 2018, 9 Pages.
Extended European Search Report for European Application No. 20216989.2, mailed Mar. 29, 2021, 7 Pages.
Extended European Search Report for European Application No. 22157724.0, mailed May 31, 2022, 8 Pages.
Hcker Kchen: "Sales Manual 2010," Jan. 1, 2010, pp. 1-6,24-34 (17 Pages) XP055502720.
International Preliminary Report on Patentability for International Application No. PCT/DE2012/000458, mailed Aug. 14, 2013, 29 Pages.
Miele: "The Miele Kitchen", Point System, Apr. 1, 2009, 40 Page, XP055502729.
Office Action for European Application No. 15177616.8, mailed Aug. 1, 2016, 05 Pages.
WESCO: "Huttenlufter Aerateur RVM," Wesco AG-PROSPEKT, Apr. 1, 1988, 1 Page, XP055661580.

* cited by examiner
† cited by third party

HOB WITH CENTRAL DOWNWARD REMOVAL OF COOKING VAPORS THROUGH SUCTION

CROSS REFERENCE TO RELATED APPLICATIONS

This application is a continuation of, and claims the benefit of priority under 35 U.S.C. § 120 of U.S. patent application Ser. No. 16/907,628 filed Jun. 22, 2020, which is a continuation under 37 CFR 1.53(b) of pending prior U.S. patent application Ser. No. 15/988,237 filed May 24, 2018, which is a continuation of U.S. patent application Ser. No. 14/114,351 filed Oct. 28, 2013, and claims the benefit (35 U.S.C. § 120 and 365(c)) of International Application PCT/DE2012/000458 filed Apr. 28, 2012, which designated inter alia the United States and which claims the priority of German Patent Application DE 20 2011 005 698.8 filed Apr. 28, 2011, the entire contents of each application are incorporated herein by reference.

FIELD OF THE INVENTION

The present invention pertains to a hob with one or more cooking locations with the hob comprising one or more recesses only in an area around its geometric center, which are connected with one or more devices for removing cooking vapors through suction, wherein the devices for removing cooking vapors through suction downwardly to remove the cooking vapors that arose or arise above the cooking locations by suction in a direction pointing vertically below the hob.

BACKGROUND OF THE INVENTION

Known from prior art is a hob that exhibits oblong, rectangular slits on both sides and on the back, though which cooking vapors that arise in the hob area are downwardly removed through suction.

This hob known from prior art with suction slits provided on both sides and on the back is disadvantageous in particular because the countertop that carries the hob cannot be completely used for temporary storage or similar purposes, at least right to the side of the hob.

This hob encompassed by prior art with suction slits provided on both sides and on the back is also disadvantageous because the two lateral and rear suction flows cancel each other out completely or at least partially, above all in the especially important area in the center of the hob, so that cooking vapors that arise there are not exposed to any effective suction flow, thus allowing them to expand and rise unimpeded.

Another disadvantage to this hob originating from prior art with suction slits provided on both sides and on the back is that it entails marked manufacturing and material costs, in particular due to the design of the three suction devices and the foul-air duct system connected with the latter.

The maintenance costs for this known hob are also especially high, in particular since it has three grease filters that have to be maintained.

Since strong suction flows are released at the same time through all suction slits in this known hob with suction slits provided on both sides and on the back when the cooking vapor suction device is activated, the energy expenditure required for removing cooking vapors through suction is there especially high, giving this known hob a noticeably low efficiency.

In light of the three strong suction flows required there, the exposure to noise generated by the flows and fan motors of the suction system is also pronounced there.

Another important disadvantage to the known hob with cooking vapor suction slits provided on both sides and on the back is that it requires a material and time-intensive assembly of the hob on the countertop carrying the hob by means of a separate mounting frame, while bridging the cooking vapor suction slits on both sides and on the back.

SUMMARY OF THE INVENTION

The object of the present invention is to provide a hob with a device for removing cooking vapors through suction in a direction lying vertically below the plane of the hob, which does not use the surfaces on the countertop carrying the hob that are located on both sides and on the back of the hob, but rather allows them to be used for temporary storage or similar purposes, which reliably prevents cooking vapors from rising and expanding both in the central area of the hob and in its edge areas, which entails especially low manufacturing, assembly, maintenance and operating costs, which requires no separate mounting frame for securing the enveloping countertop, which is especially efficient in terms of the energy used for suction purposes, and which generates very little noise during its operation.

This object is achieved in a generic device by the features of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
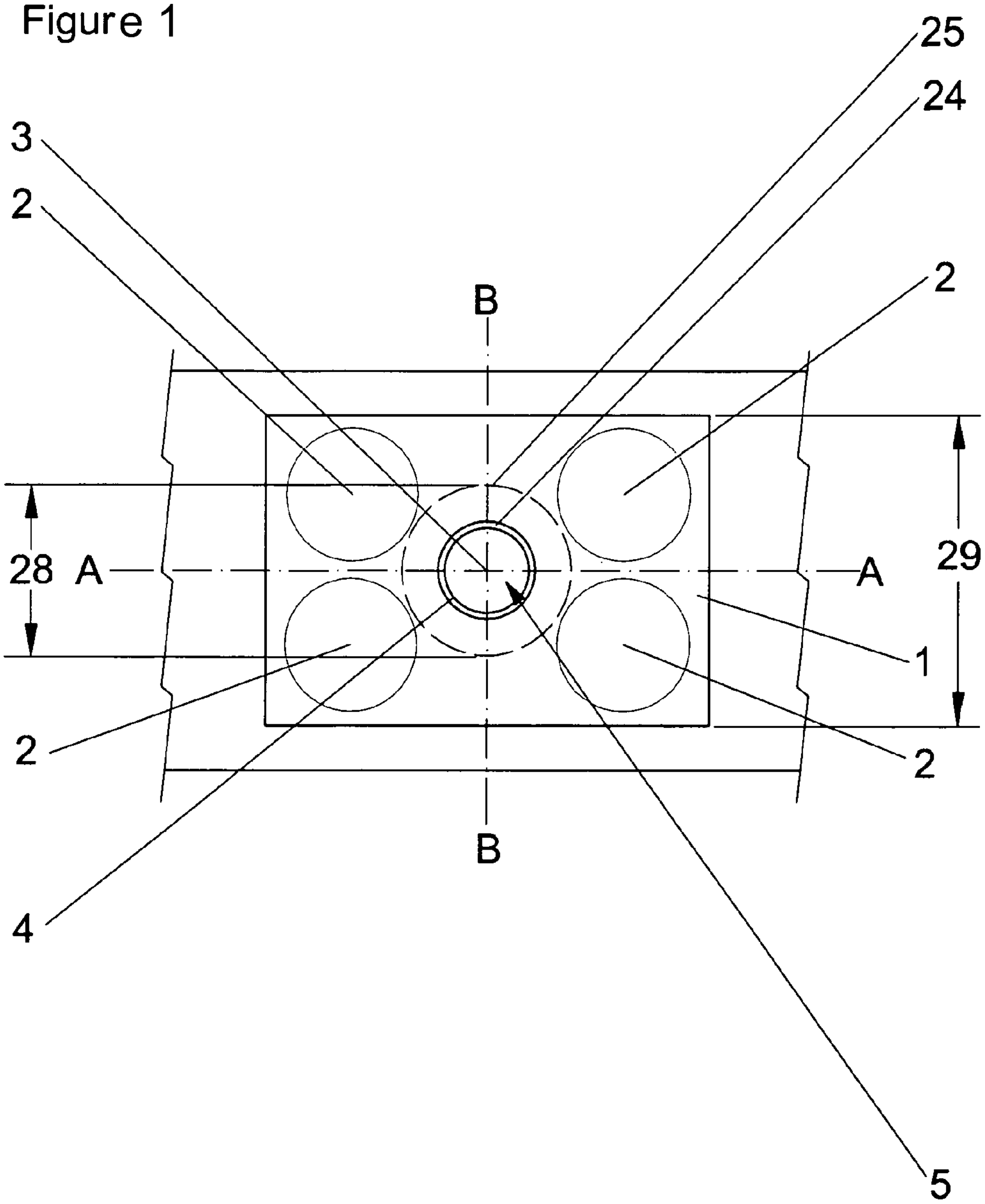
FIG. 1 is a top view of a hob (1) according to the invention with a central recess (4) for a device (5) for downwardly removing cooking vapors through suction.

As a consequence, the present invention relates to a hob (1) with one or more cooking locations (2), which as viewed from above exhibits one or more recesses (4) only in the area (25) around its geometric center (3), but not in its edge areas.

As a rule, these recesses (4) are connected with one or more devices (5) for removing cooking vapors through suction, wherein these devices (5) for removing cooking vapors through suction downwardly remove the cooking vapors that arose or arise above the cooking location(s) (2) by suction in a direction pointing vertically below the hob (1).

In general, the diameter (28) of the area (25) for the one or several recesses (4) around the geometric area center (3) of the hob (1) can measure between 10% and 90% of the overall width (29) of the hob (1), preferably between 15% and 85%, in particular between 20% and 80% of the overall width (29) of the hob (1). The shape of the one or more recesses (4) as viewed from above can preferably be round or oval or square or rectangular or polygonal or radial. For example, the surface of the recess (4) of the hob (5) can measure between 50 $cm^2$ and 500 $cm^2$, preferably between 60 $cm^2$ and 400 $cm^2$, in particular between 70 $cm^2$ and 300 $cm^2$. Each recess (4) of the hob (1) can preferably be reversibly closed and opened manually and/or by means of an electric or pneumatic drive, whether over the entire surface or by sectors.

According to FIGS. 3, 5, 6 and 7, a one-part or multipart grease filter insert (6) can be inserted into each recess (4) of the hob (1). As a rule, this grease filter insert (6) is enveloped by a foul-air duct (9) from the sides and/or bottom. The grease filter insert (6) is preferably tightly connected with the edge area of the recess (4) of the hob (1).

For example, the grease filter insert (6) can exhibit a cross section shaped like the letter U (see FIGS. 2, 3, 6 and 7). As an alternative to the above, the grease filter insert (6) can take the form of the letter U with a sack-shaped or cap-shaped expansion (17) (see FIG. 5) of its lower area toward the side and/or in the downstream direction, so as to enlarge the filter surface and reduce the flow rate, and hence to improve the effect of the grease filter insert (6). In general, the wall areas of the grease filter insert (6) can exhibit suction openings (7) with grease filters (8) integrated therein, or be designed at least regionally like a gas-permeable grease filter (6).

Figure 2:
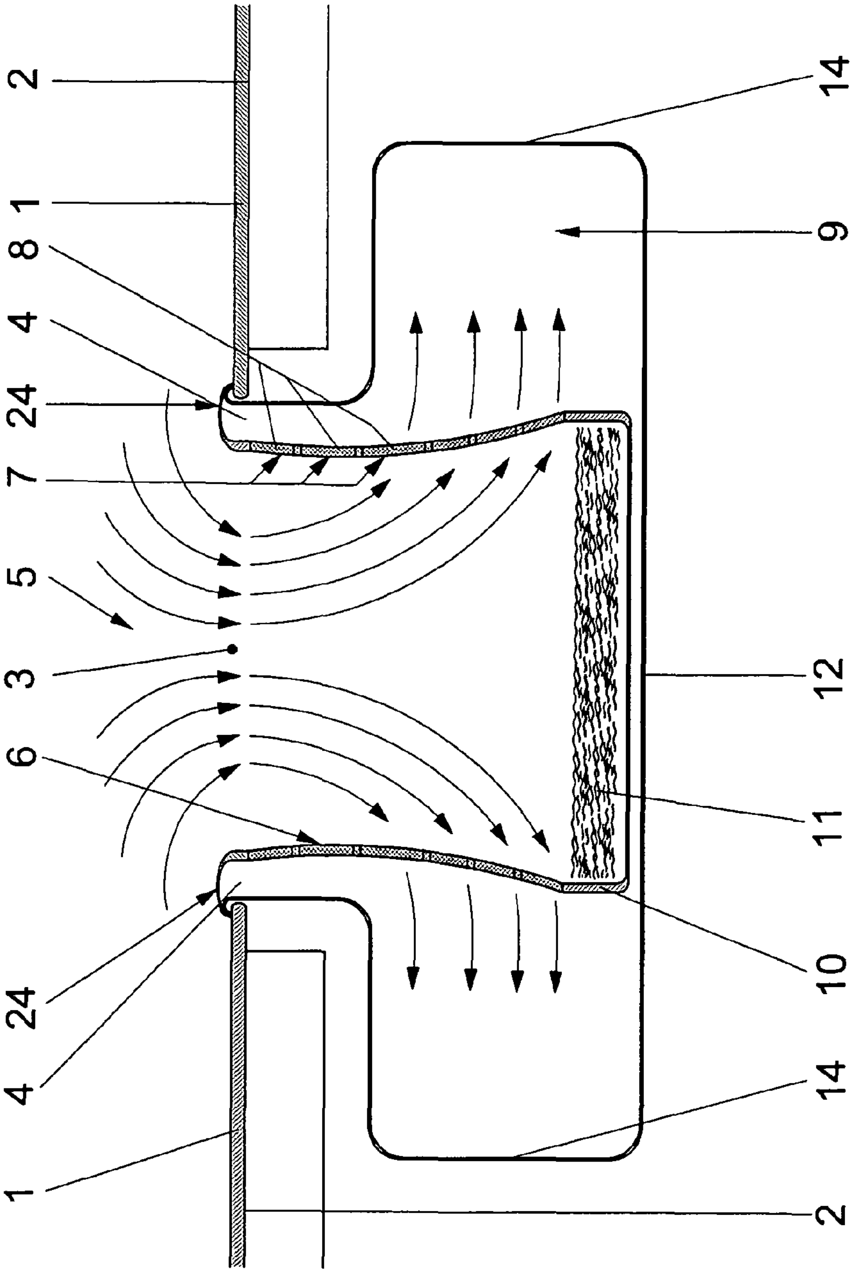
FIG. 2 is a schematic cross section of a hob (1) according to the invention along the A-A line depicted on FIG. 1 with a grease filter insert (6), whose floor area exhibits a collecting tray (10) for liquid that entered through the central recess (4), and whose lateral walls located above the latter are permeable to the imbibed cooking vapors in the direction of the foul-air duct (9)
Figure 3:
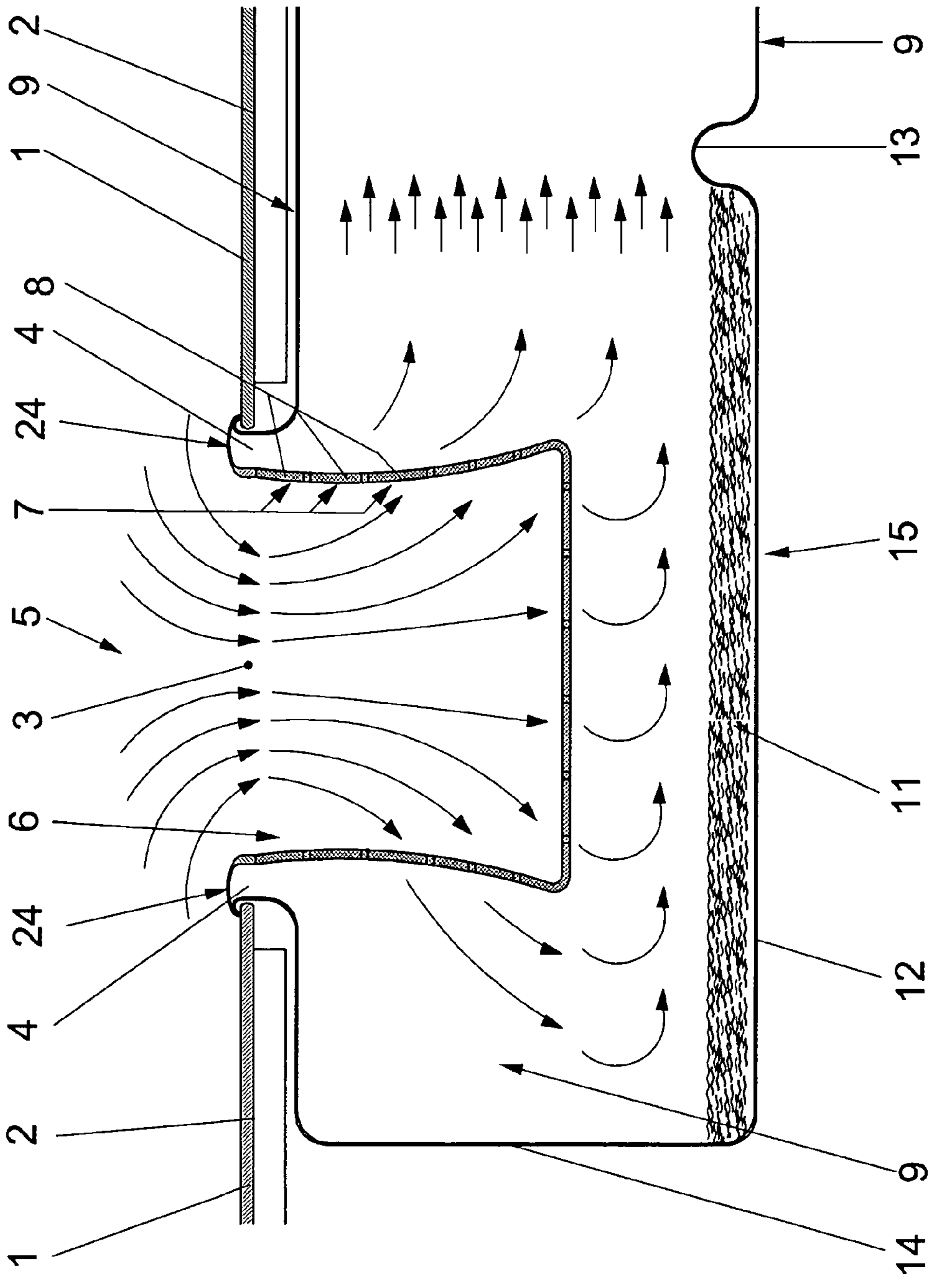
FIG. 3 is a schematic cross section of a hob (1) according to the invention along the B-B line depicted on FIG. 1 with a grease filter insert (6), whose lateral walls and floor are permeable to the imbibed cooking vapors in the direction of the foul-air duct (9), wherein the bottom side (12) of the foul-air duct (9) below the area of the central recess (4) takes the form of a collecting basin (15) for liquids (11)

As may be gleaned in particular from FIG. 2, the floor area of the grease filter insert (6) can be designed as a collecting tray (10) for collecting liquid (11) that entered into the recess (4) of the hob (1). As an alternative thereto, both the lateral walls of the grease filter insert (6) and its floor can be permeable to cooking vapors, as depicted in FIGS. 3, 4, 5, 6 and 7.

In order to prevent liquid (11) that penetrated through the central recess (4) of the hob (1) from further advancing into downstream sections of the foul-air duct (9), a liquid barrier (13) that is raised over the level of the bottom side (12) of the foul-air duct (9) can be provided on the bottom side (12) of the foul-air duct (9) immediately downstream behind the central recess (4).

One special advantage to the device according to the invention lies in the fact that the liquid collecting basin (15) provided below the central recess (4) of the hob (1) and bordered by the liquid barrier (13) downstream and otherwise by the walls (14) of the foul-air duct (9) can be manually drained and cleaned through the central recess (4) of the hob (1).

Figure 4:
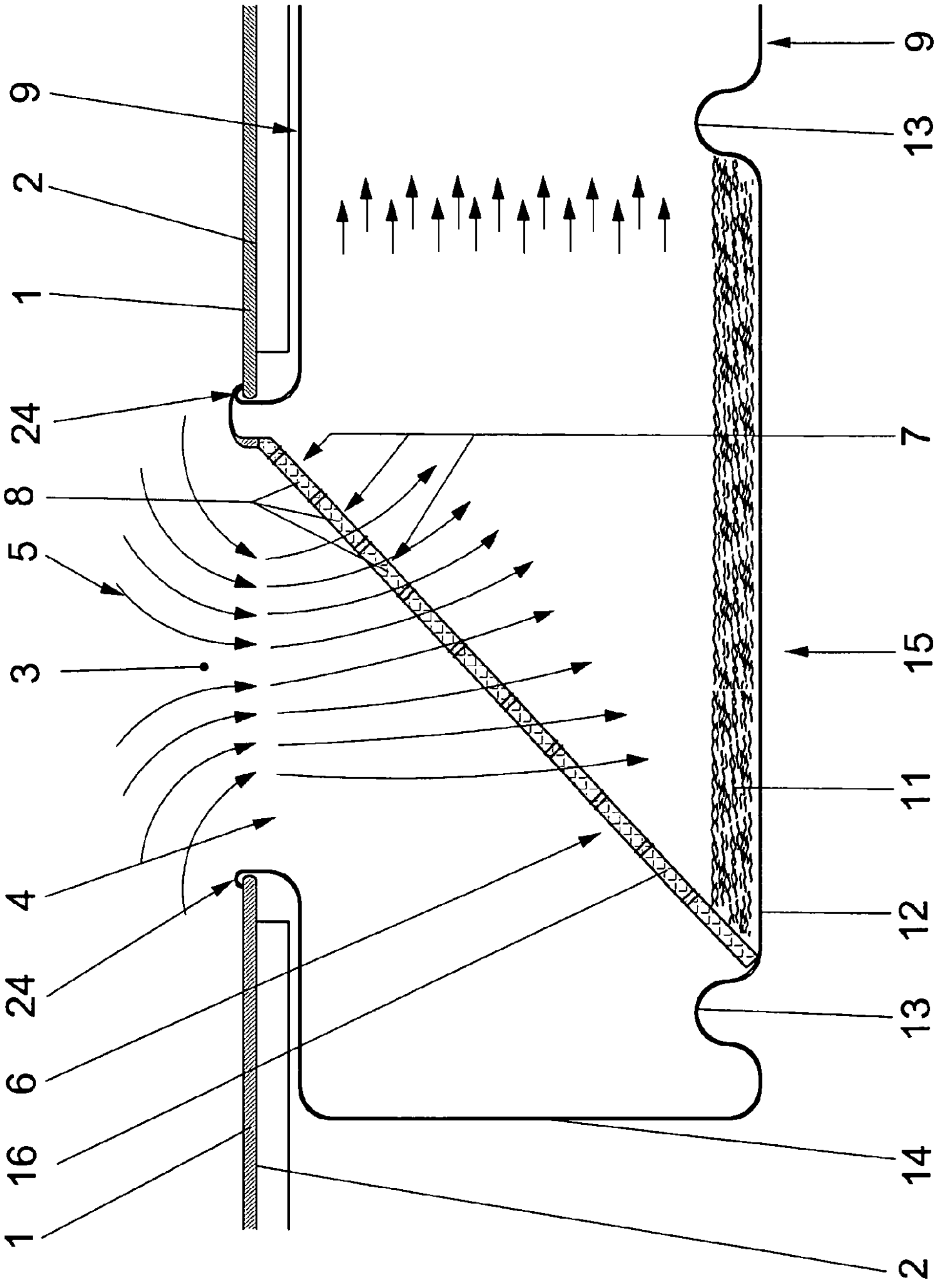
FIG. 4 is a schematic cross section of a hob (1) according to the invention along the B-B line depicted on FIG. 1 with an inclined, plate-type grease filter plate (16), which covers the cross section of the foul-air duct (9), and is provided below the central recess (4) of the hob (1)
Figure 5:
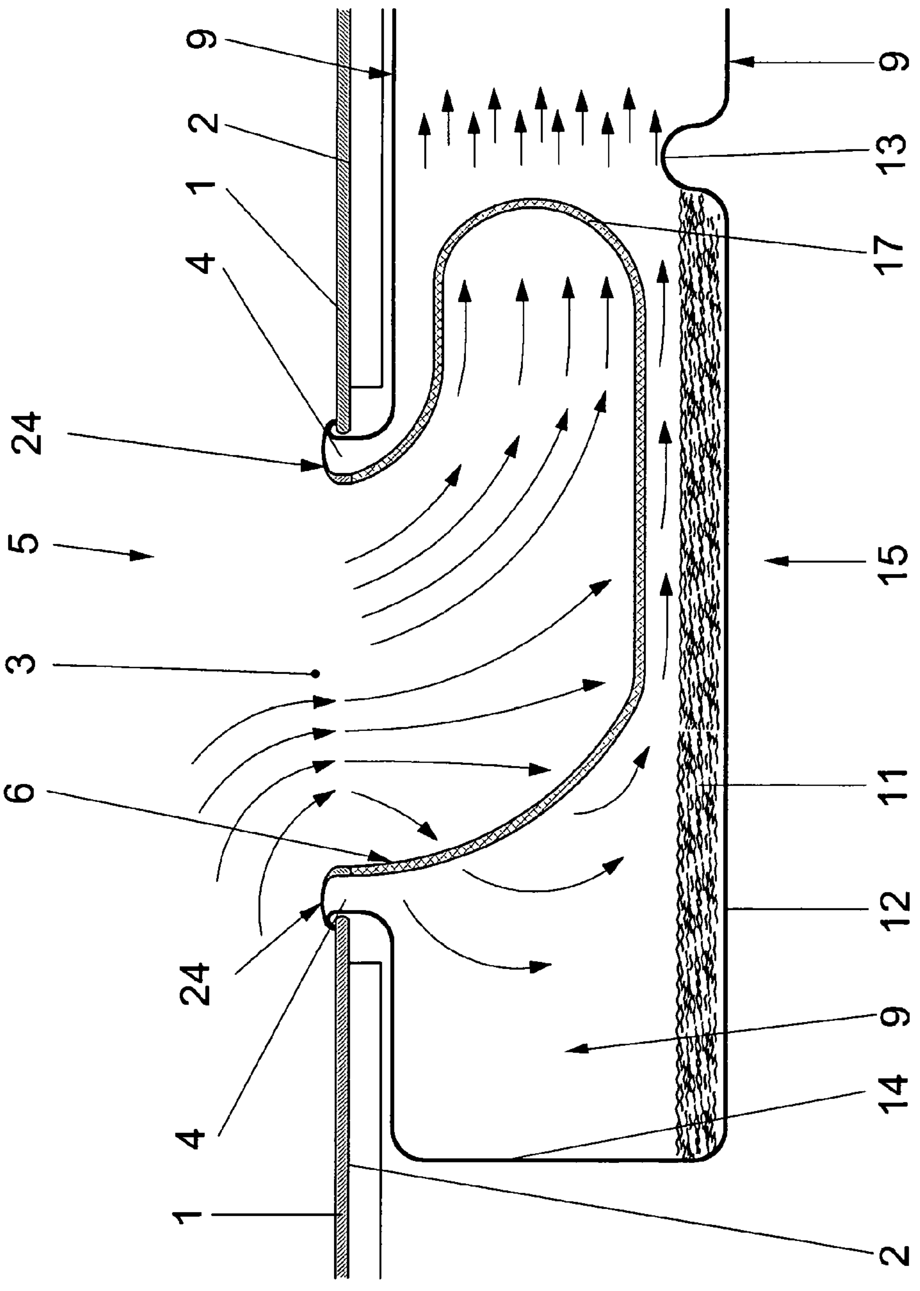
FIG. 5 is a schematic cross section of a hob (1) according to the invention along the B-B line depicted on FIG. 1 with a grease filter insert (6), which is shaped like the letter U with a cap-like expansion (17) of the lower area hereof in a downstream direction and permeable to cooking vapor.

For example, according to FIG. 4, the grease filter insert (6) can be designed like a grease filter plate (16) that covers the cross section of the foul-air duct (9) and is inclined below the central recess (4) of the hob or just downstream from the latter.

Figure 6:
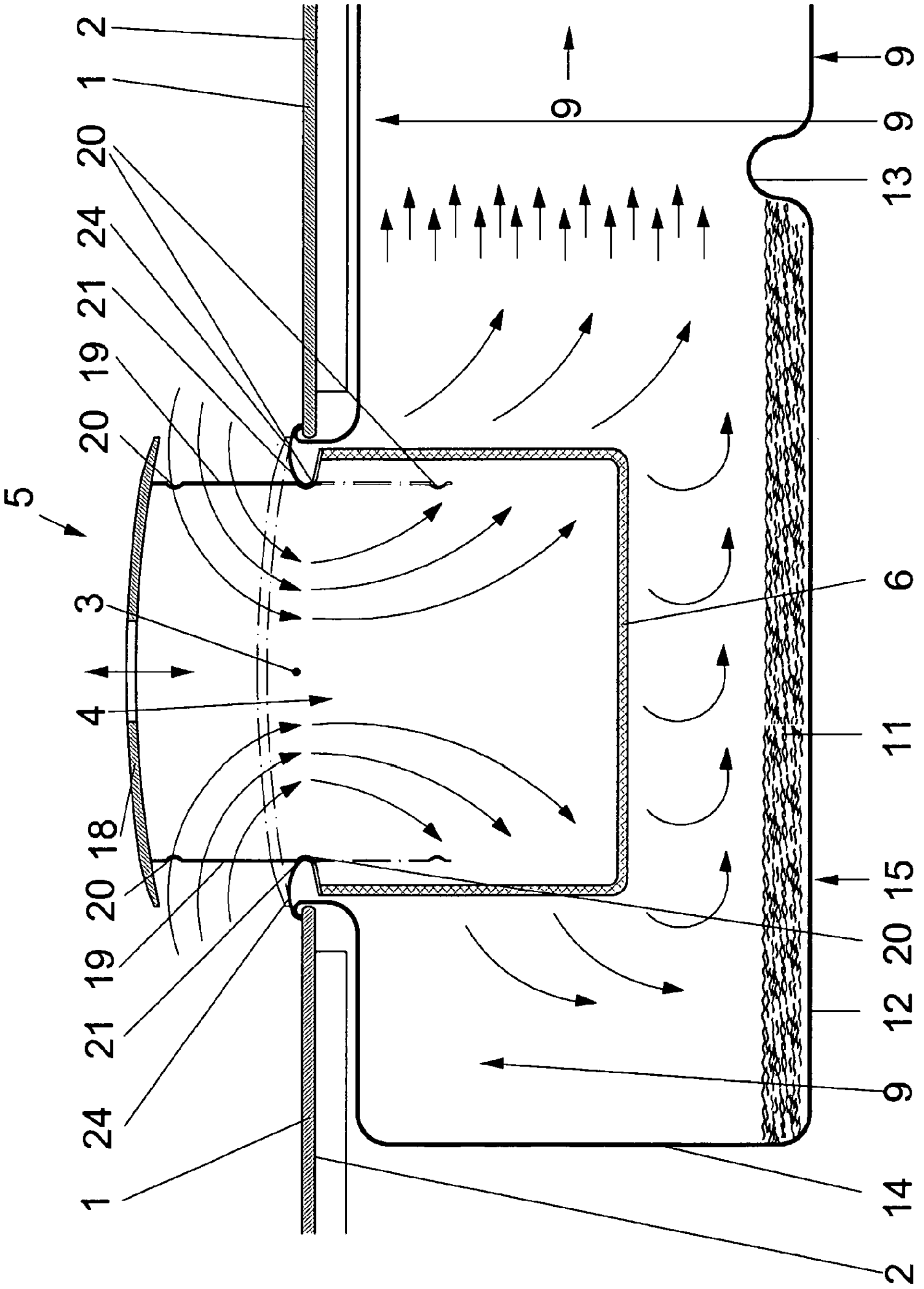
FIG. 6 is a schematic cross section of a hob (1) according to the invention along the B-B line depicted on FIG. 1, wherein the central recess (4) of the hob (1) can be opened and closed by means of a cover-type closure element (18) that can be reversibly displaced in a vertical direction, wherein two flexible fork legs (19) with locking grooves (20) for locking in projections (21) of the grease filter insert (6) are provided on the lower side of the closure element.

For example, according to FIG. 6, the central recess (4) of the hob (1) can be closed over the entire surface by means of a cover-shaped closure element (18) that can be reversibly adjusted in a vertical direction for opening and closing purposes so as to seal out odors.

In this case, the bottom side of the closure element (18) can be provided with two or more flexible fork legs (19) with locking grooves (20) for locking in projections (21) of the grease filter insert (6), the foul-air duct (9) or the central recess (4).

As an alternative thereto, the bottom side of the closure element (18) can be provided with two or more rigid legs (19) with locking grooves (20) for locking in flexible projections (21) of the grease filter insert (6), the foul-air duct (9) or the central recess (4).

Figure 7:
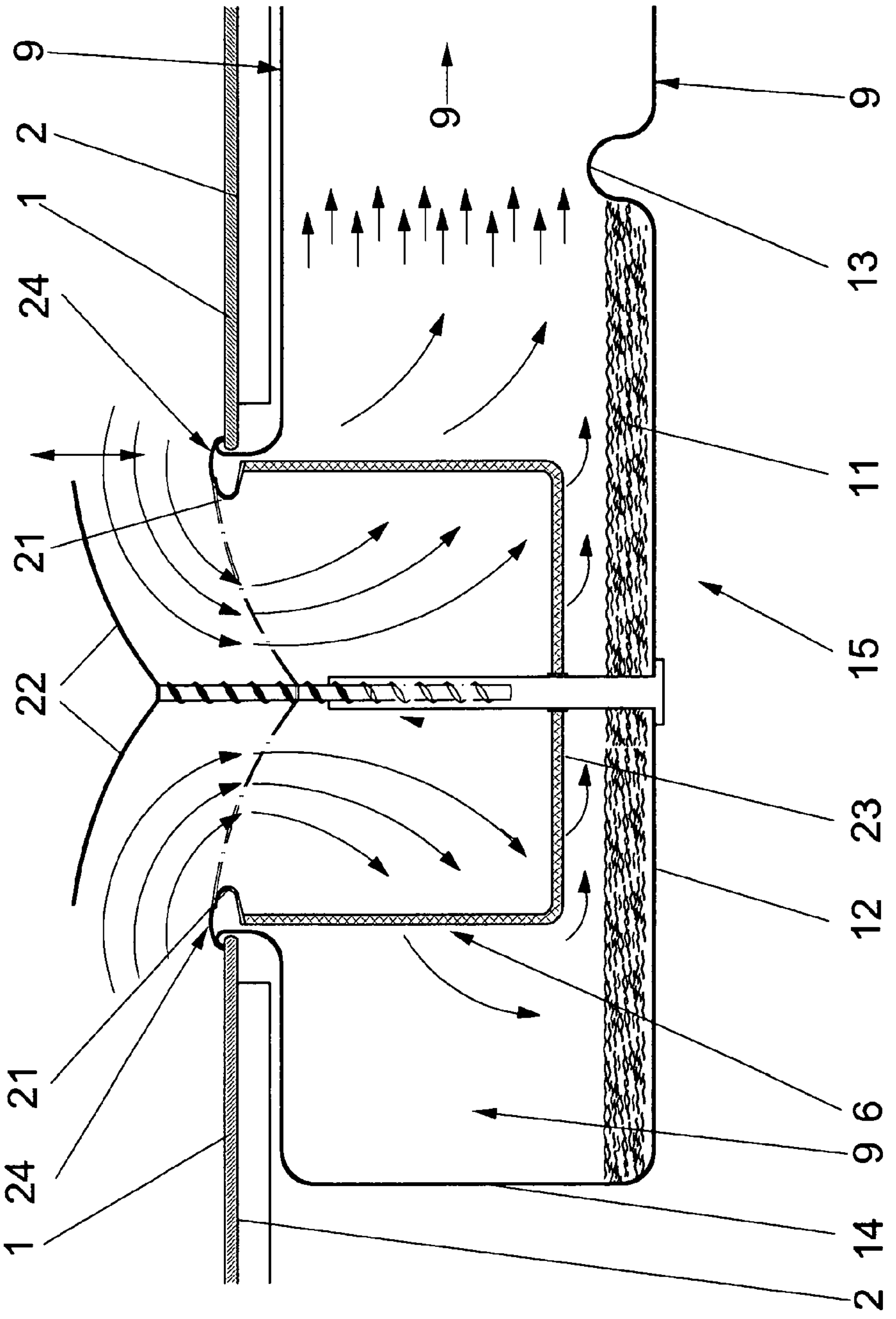
FIG. 7 is a schematic cross section of a hob (1) according to the invention along the B-B line depicted on FIG. 1, wherein the central recess (4) of the hob (1) can be opened and closed by means of a Y-shaped closure element (18) that can be reversibly displaced in a vertical direction, wherein the lower side of this Y-shaped closure element (22) acts as a flow optimizing and guiding surface for the imbibed cooking vapors, and the Y-shaped closure element (22) can be vertically displaced by means of a thread (23)

As shown in FIG. 7, the central recess (4) of the hob (1) can be closed by means of a closure element (22) with a Y- or V-shaped cross section that can be reversibly adjusted in a vertical direction for opening and closing purposes.

In this case, the bottom sides of this Y- or V-shaped closure element (22) can serve as flow optimizing and guiding surfaces for the cooking vapors to be removed by suction. The Y- or V-shaped closure element (22) can preferably be vertically and reversibly adjusted by means of an eccentric disk, a lever mechanism, or a thread (23).

Figure 8:
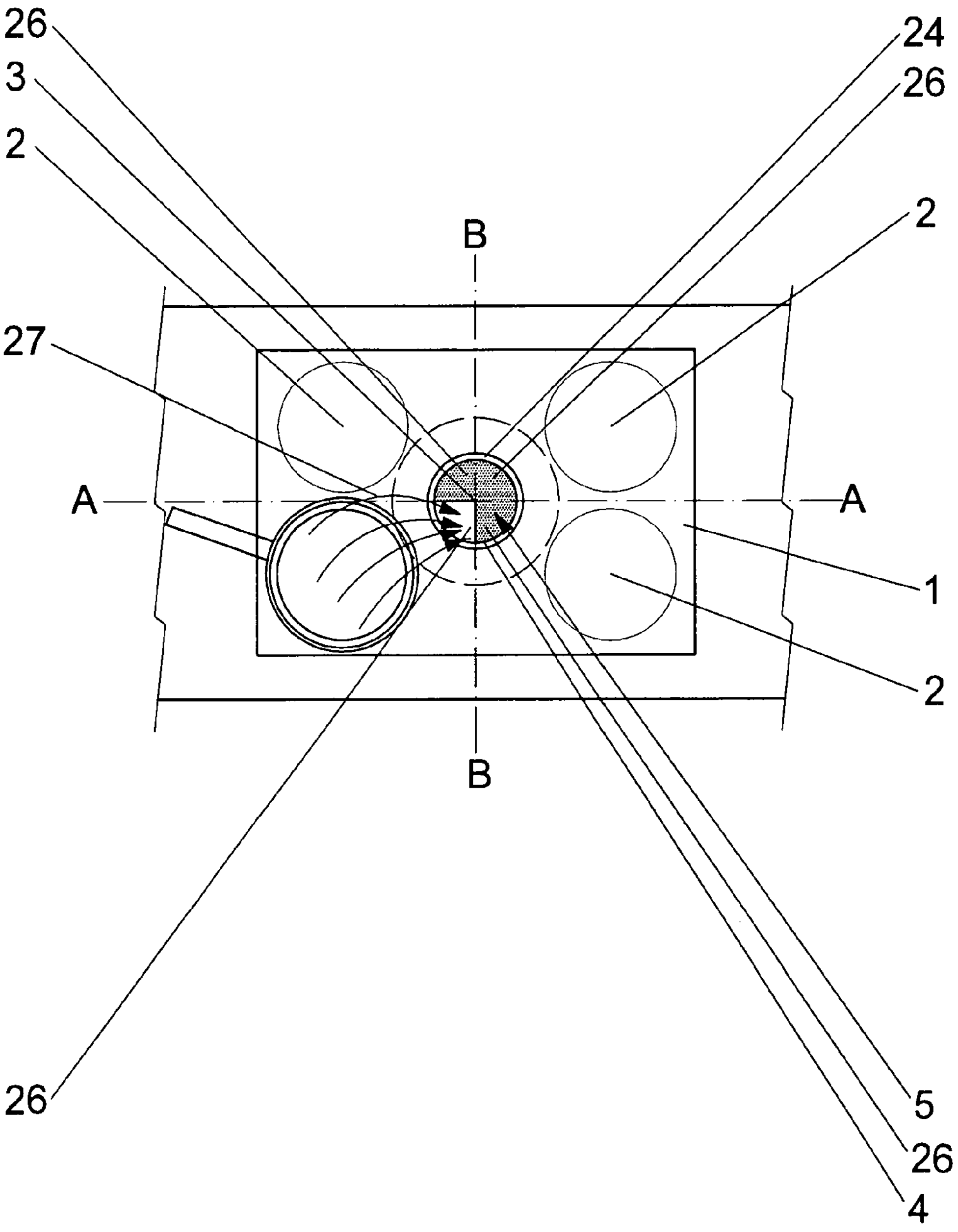
FIG. 8 is a schematic top view of a hob (1) according to the invention, which in the area (25) of the geometric center (3) of the hob (1) exhibits a recess (4) in the hob (1), which encompasses one or more sector-type closure elements (26) that can be reversibly closed and opened so as to control the direction (27) of cooking vapor removal by suction as a function of the direction of the respective cooking location (2) that is generating cooking vapor, as well as to economize the fan energy to be expended on the device (5) for removing cooking vapors by suction.

As evident from FIG. 8, the recess (4) of the hob (1) located in the area (25) around the geometric center (3) of the hob (1) can exhibit one or more sector-type closure elements (26) that can be reversibly closed and opened so as to control the direction (27) of cooking vapor removal by suction as a function of the direction of the respectively active cooking location (2) that is generating cooking vapor, as well as to economize the fan energy to be expended on the device (5) for removing cooking vapors by suction. For example, these closure elements (26) can be manually and/or electrically reversibly opened and closed.

As evident from FIGS. 1 to 8, the edge of the central recess (4) of the hob (1) can be provided with overflow protection by carrying a coupler (24) that projects above and envelops the plane of the hob (1), and is formed by the foul-air duct port and/or the grease filter insert suspension device.

Figure 9:
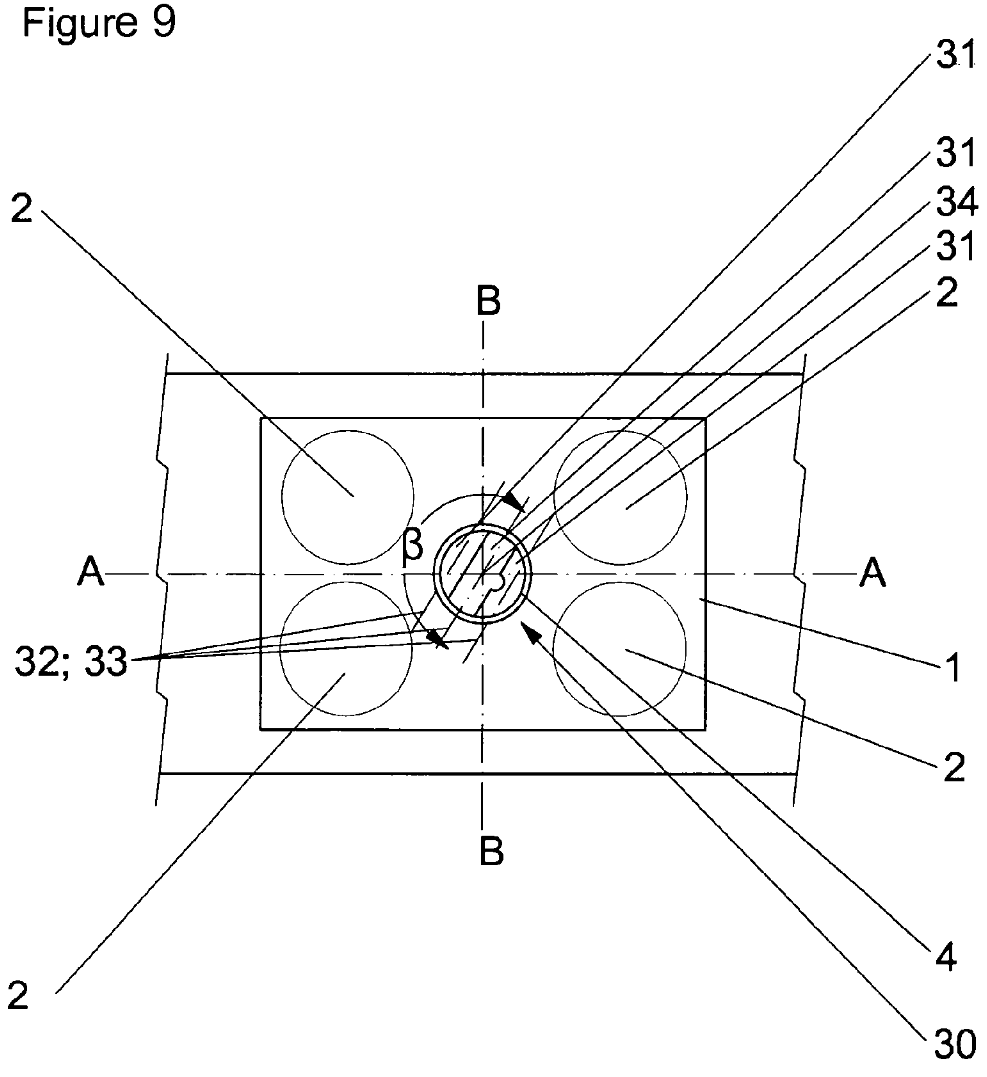
FIG. 9 is a schematic top view of a hob (1) according to the invention, whose central recess (4) carries a bladed shutter (30)
Figure 10:
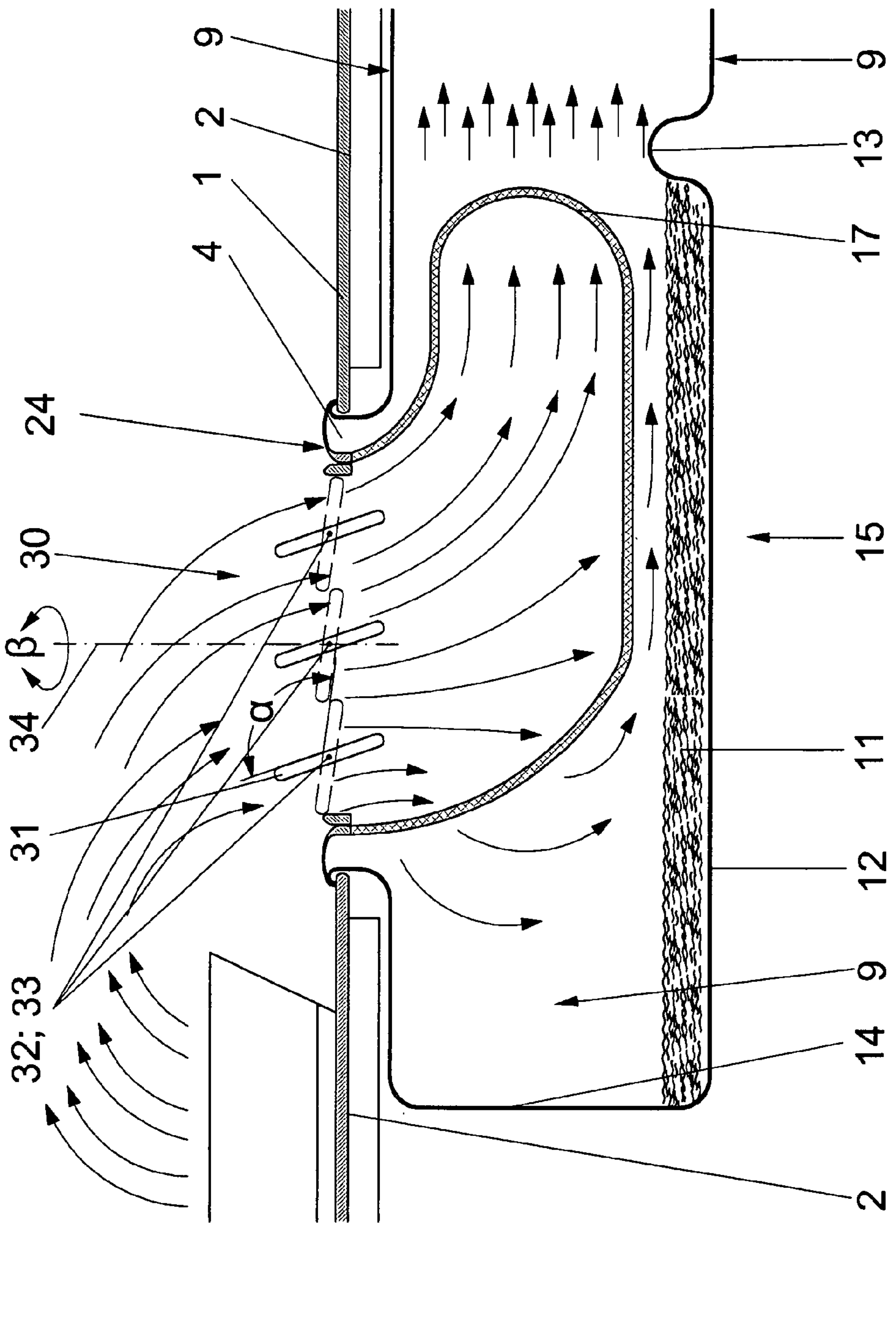
FIG. 10 is a schematic cross section of a hob (1) along the B-B line depicted on FIG. 9, wherein the central recess (4) of the hob (1) can be reversibly closed by means of a bladed shutter (30) with swivelling blades (31) provided just above the plane of the hob (1)
Figure 11:
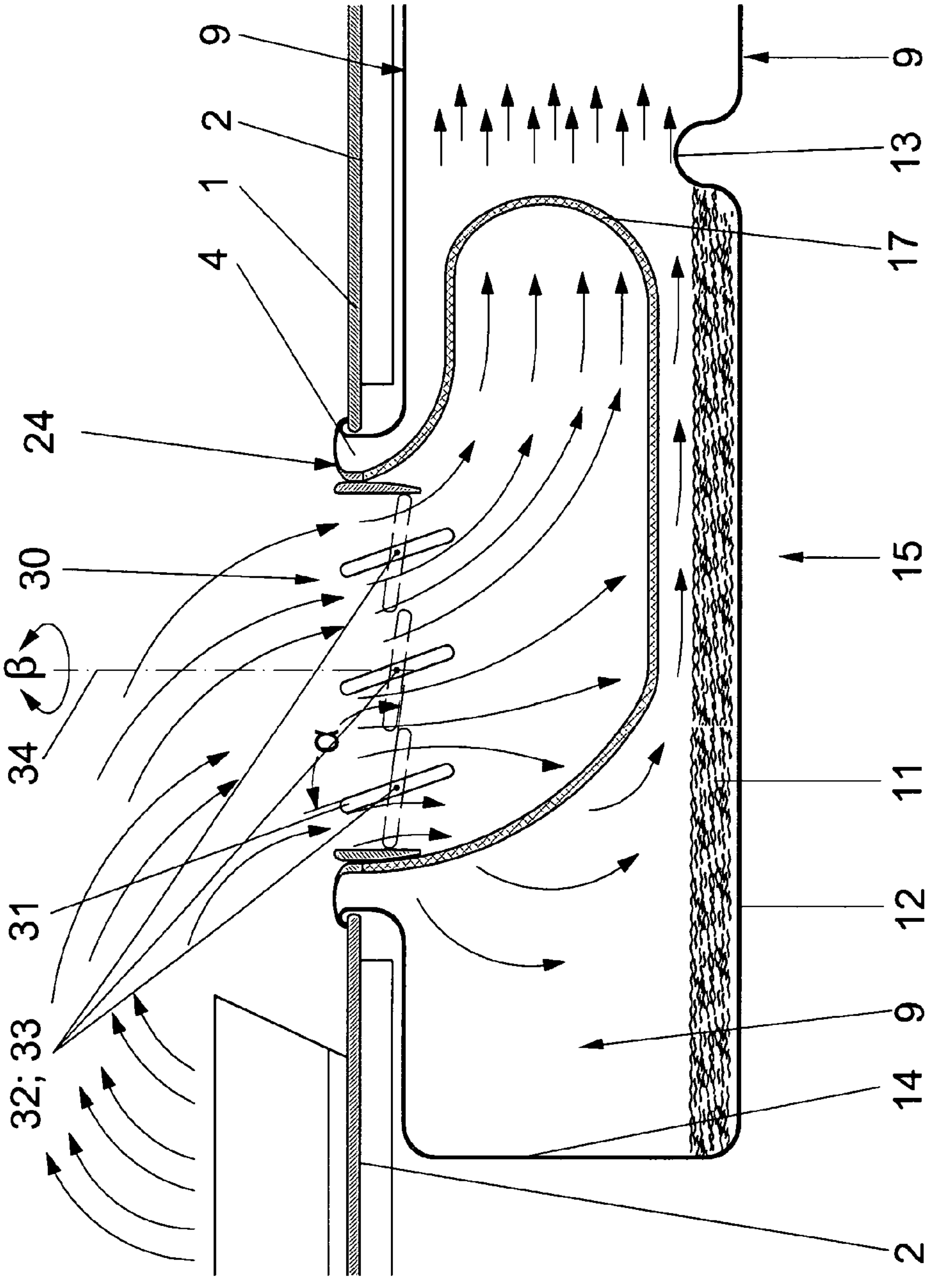
FIG. 11 is a schematic cross section of a hob (1) along the B-B line depicted on FIG. 9, wherein the central recess (4) of the hob (1) can be reversibly closed by means of a bladed shutter (30) with swivelling blades (31) provided just below the plane of the hob (1)

FIGS. 9, 10 and 11 show that the one or several central recesses (4) of the hob (1) can each exhibit one or more bladed shutters (30) for flow optimization. This blade shutter (30) is advantageous in particular for a horizontal, and possibly also for a vertical, alignment of the cooking vapor suction flow (27) in the direction of the respectively active cooking location(s) (2).

As a rule, each bladed shutter (30) encompasses one or several blades (31), whose longitudinal axes (32) are preferably horizontally aligned.

In especially preferred embodiments of the hob (1) according to the invention, each blade (31) can be reversibly swivelled to and fro around a horizontal pivoting axis (33) at an angle $\alpha$, which can measure between 0° and 180°, preferably between 0° and 110°, in particular between 0° and 90°, especially so as to vertically align the cooking vapor suction flow (27), and hence to adjust to the vertical height of the used cookware.

For example, in particular to horizontally align the cooking vapor suction flow (27) in the direction of the respectively active cooking location(s) (2), the bladed shutter (30) can reversibly turn around its vertical axis (34) at an angle $\beta$. For example, this angle $\beta$ can measure between 0° and 360° without limitation. As may be gleaned in particular from FIG. 10, the plane of the bladed shutter (30) can lie just above the plane of the hob (1). As an alternative thereto, the plane of the bladed shutter (30) can lie roughly at the vertical height of the hob (1). However, according to FIG. 11, the plane of the bladed shutter (30) can also be provided below the hob (1). In especially preferred embodiments of the hob (1) according to the invention, the bladed shutter (30) can be removed from the central recess (4) of the hob (1) for cleaning purposes.

The present invention further relates to a hob (1) with a central recess (4), which takes the form of an assembly unit with a device (36) provided on its bottom side (35) for operating the hob (1) and downwardly removing cooking vapors by suction, and can be quickly and easily inserted into a recess of the kitchen countertop (54) whose dimensions correspond thereto.

As depicted in particular in FIGS. 12 to 16, the bottom side (35) of the hob (1) in the device (36) as viewed downwardly sequentially in a vertical direction can encompass a housing (44) for the heating or hob heating and control electronics, a fan housing (48) for two or more radial fans (38), and one or more cooking vapor aspiration chambers (39) for horizontally relaying the cooking vapors toward the outside, as well as for preparing the cooking vapor stream to be vertically aspirated toward the top by means of the radial fans (38) provided in the fan housing (48) situated vertically higher.

One special advantage to this hob (1) designed according to the invention is that the distance (40) between the bottom side (35) of the hob (1) on the one hand and the bottom side of the floor (42) of the cooking vapor aspiration chambers (39) on the other only measures between 110 mm and 260 mm, preferably between 140 mm and 230 mm, in particular between 150 mm and 200 mm.

Figure 14:
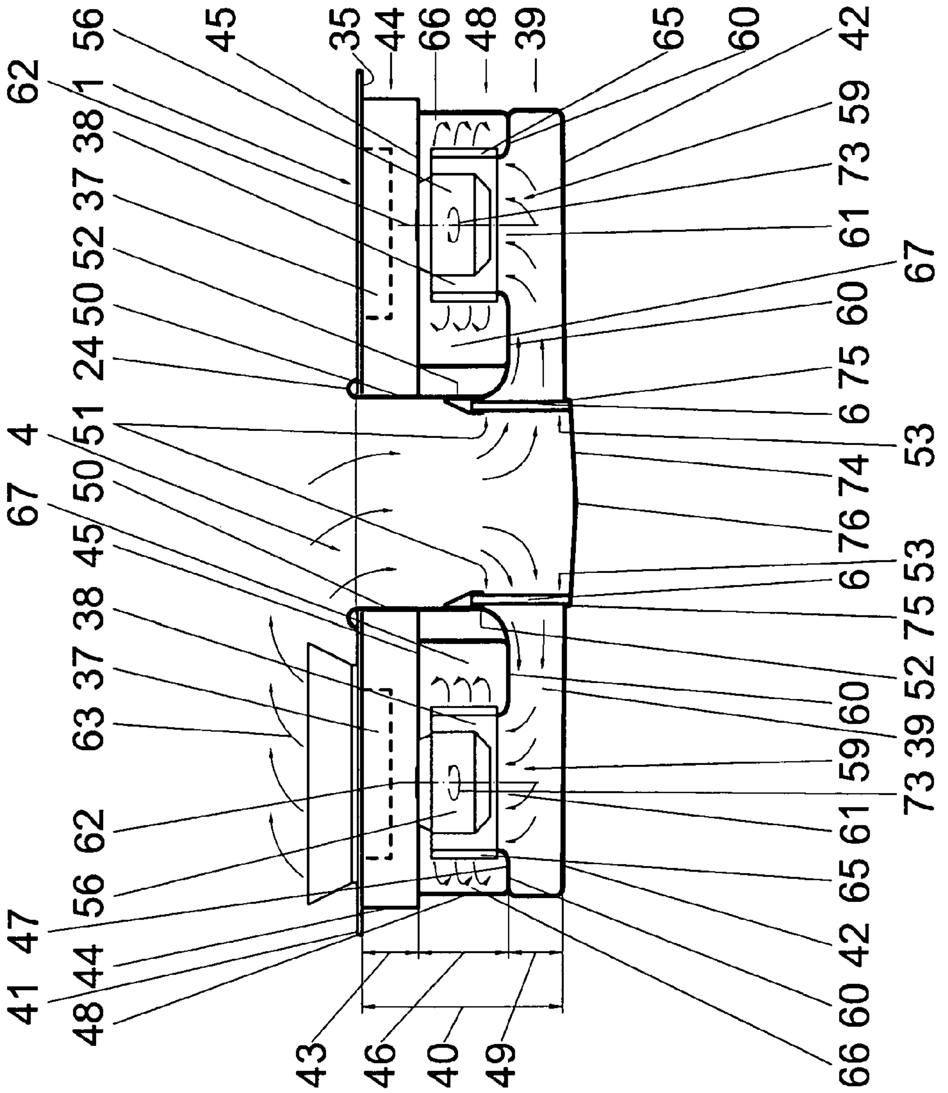
FIG. 14 is a schematic, longitudinal section along the A-A line of the assembly unit depicted on FIG. 15 comprised of a hob (1) and a device (36) for operating the hob (1) and downwardly removing cooking vapors by suction.
Figure 15:
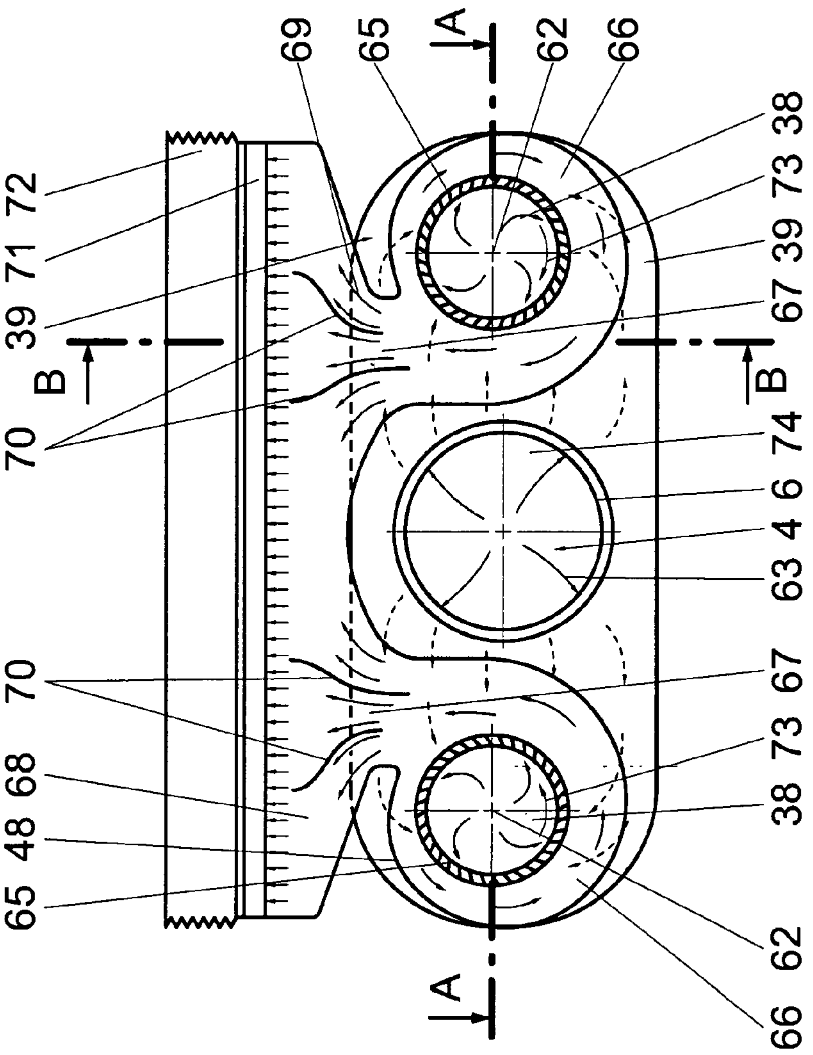
FIG. 15 is a schematic top view of an assembly unit according to the invention comprised of a hob (1) and a device (36) for operating the hob (1) and downwardly removing cooking vapors by suction, wherein the hob (1) has been removed to improve the clarity of the image.
Figure 16:
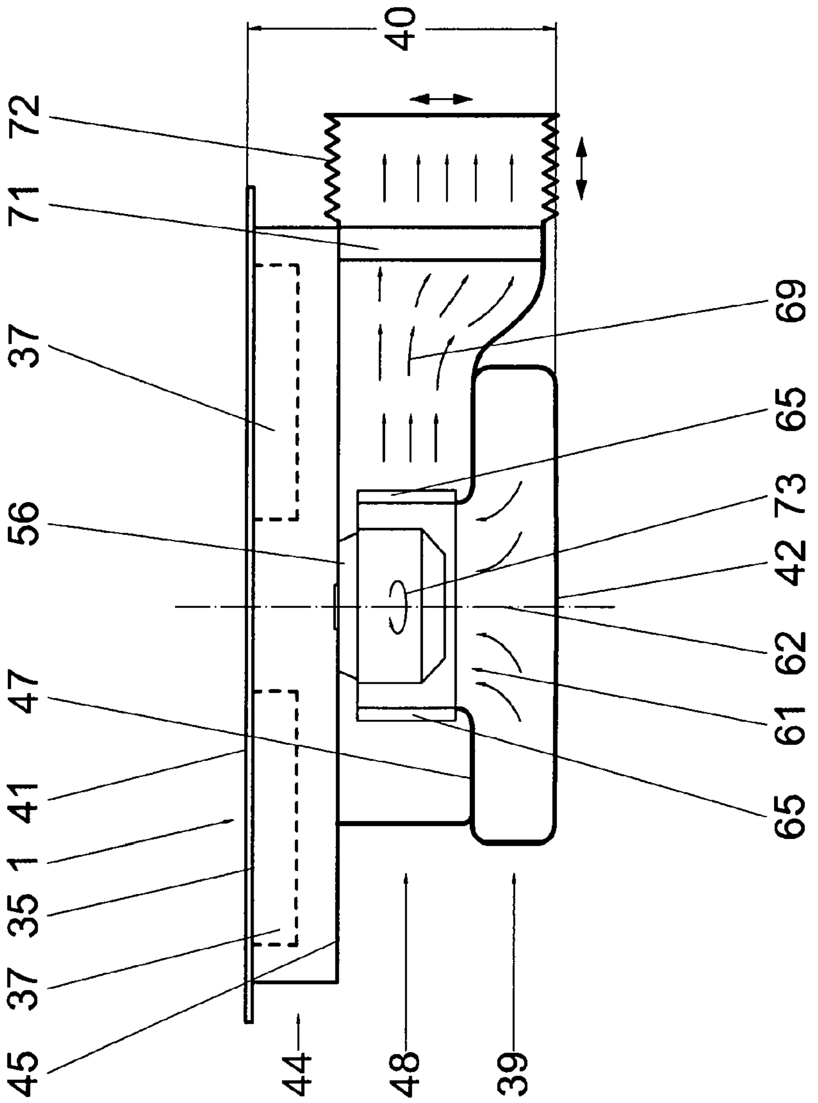
FIG. 16 is a schematic, longitudinal section along the B-B line of the assembly unit depicted on FIG. 15 comprised of a hob (1) and a device (36) for operating the hob (1) and downwardly removing cooking vapors by suction.

As may be gleaned in particular from FIGS. 14, 15 and 16, for example, a tubular foul air line (50) directed vertically downward can be provided downstream from the central recess (4) of the hob (1) in this hob (1) designed as an assembly unit with a device (36).

As a rule, a hollow cylindrical filter (6) can be provided downstream after the foul air line (50), and can be reversibly removed toward the top through the central recess (4) of the hob (1) for cleaning purposes.

In general, the upper edge area (51) of the hollow cylindrical grease filter (6) can tightly abut against the inner wall of the lower section (52) of the tubular foul air line (50). The lower edge area (53) of the hollow cylindrical grease filter (6) can vertically project over the lower section (52) of the tubular foul air line (50) toward the bottom.

In preferred embodiments of the hob (1) according to the invention designed as an assembly unit with a device (36), two or more deep cooking vapor aspiration chambers (39) can be provided downstream from the hollow cylindrical grease filter (6) and laterally and horizontally outside of the latter for horizontally relaying the cooking vapors (63) that passed through the grease filter (6) toward the outside.

In particular FIGS. 14 and 16 show that two or more recesses (61) for guiding the cooking vapors (63) from the bottom up to the radial fans (38) provided downstream from the recesses (61) can be provided in the middle areas (59) of the covers (60) of the cooking vapor aspiration chambers (39) lying vertically at the top.

As may be gleaned in particular from FIGS. 14 and 16, the radial fan motors (56) can be centrally secured by way of their recesses (61) in the middle areas (59) of the covers (60) of the cooking vapor aspiration chambers (39) to the bottom side (45) of the housing (44) for the heating or hob heating and control electronics.

Figure 12:
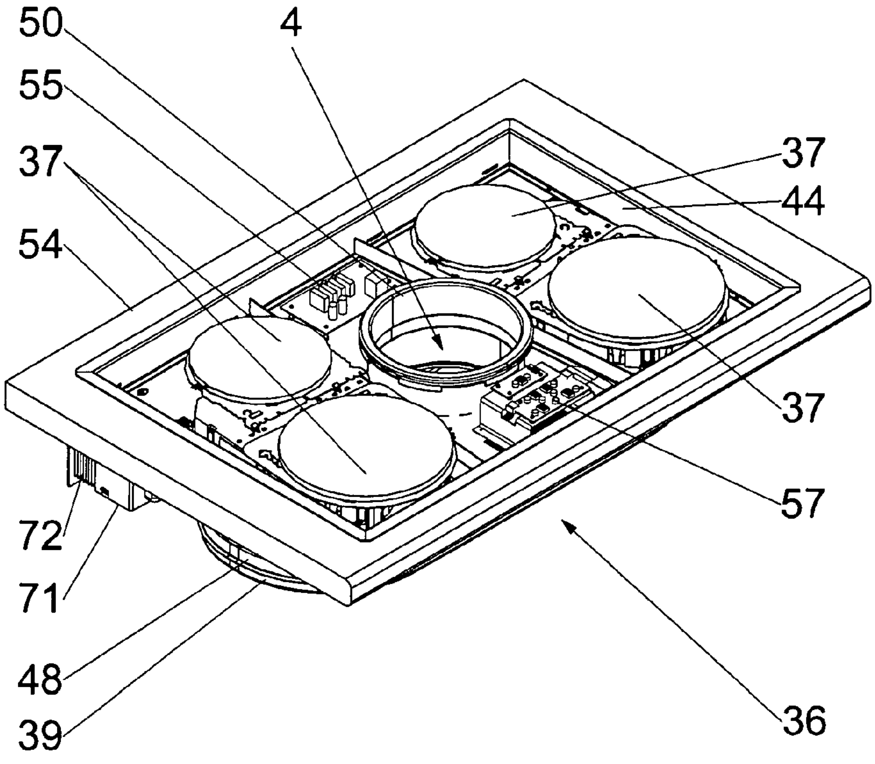
FIG. 12 is a schematic, perspective top inclined view of a hob (1) according to the invention with a central recess (4) of the hob (1), wherein the hob (1) takes the form of an assembly unit with a device (36) provided on the lower side (35) of the hob (1) for operating the hob (1) and downwardly removing cooking vapors by suction.
Figure 13:
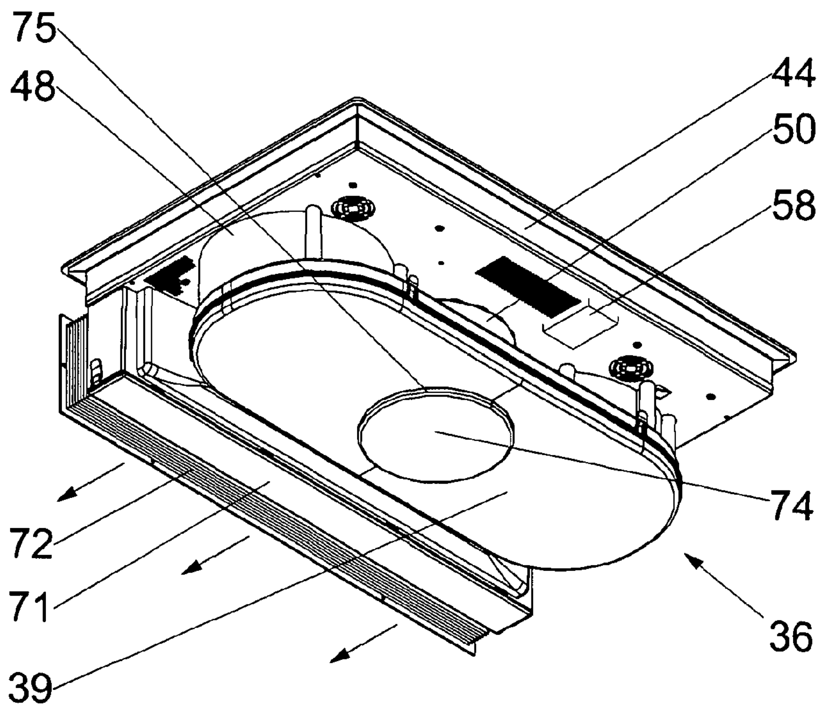
FIG. 13 is a schematic, perspective inclined view of a hob (1) according to the invention shown on FIG. 12 with a central recess (4) of the hob (1), wherein the hob (1) takes the form of an assembly unit with a device (36) provided on the lower side (35) of the hob (1) for operating the hob (1) and downwardly removing cooking vapors by suction.

Among other things, for example, the housing (44) for the heating or hob heating and control electronics can incorporate the hob heating elements (37), the power electronics (55) for the fan motors (56) and touch-control operating components (57) (see FIG. 12). Among other things, for example, the bottom side of the housing (44) for the heating or hob heating and control electronics can be provided with a device power supply line (58) (see FIG. 13).

In particular FIGS. 14 and 16 show that the rotational axes (62) of the radial fan motors (56) can be vertically aligned, and that the cooking vapors (63) aspired vertically upward by the rotating fan wheel (65) can be transported in the fan housing (48) provided above the respective aspiration chamber (39).

As evident from FIG. 15, the fan housing (48) as viewed from above can exhibit a spiral structure with an upstream guiding chamber (66) followed downstream by a pressure chamber (67). According to FIG. 15, a space (68) adjoining all pressure chambers (67) of the radial fans (38) can be provided downstream from the pressure chambers (67) for dividing and aligning the cooking vapor exhaust flows (69). For example, this space (68) can exhibit two or more air guiding surfaces (70). These air guiding surfaces (70) can preferably be arranged and shaped in such a way as to uniformly blow the cooking vapor exhaust flows (69) against the odor filter (71) provided downstream from the dividing space (68) in relation to its overall surface.

As may be gleaned from FIG. 15, a bellows (72) flexible in the horizontal and/or vertical direction can be provided downstream from the odor filter (71) for establishing a flexible, vibration and noise-decoupled connection to a following downstream foul-air duct or kitchen structure.

In especially preferred embodiments of the hob (1) according to the invention designed as an assembly unit with a device (36), the cooking vapor (63) can flow through the hollow cylindrical grease filter insert (6) at a speed measuring between 1.0 m/sec and 4.5 m/sec, preferably between 1.15 m/sec and 4.25 m/sec, in particular between 1.75 m/sec and 4.0 m/sec. In preferred embodiments of the hob (1) according to the invention designed as an assembly unit with a device (36), the cooking vapor (63) can flow through the odor filter (71) at a speed measuring between 0.5 m/sec and 3.0 m/sec, preferably between 0.7 m/sec and 2.7 m/sec, in particular between 1.0 m/sec and 2.5 m/sec.

As a rule, the distance (43) between the bottom side (35) of the hob (1) on the one hand and the bottom side (45) of the housing (44) for the heating or hob heating and control electronics on the other can measure between 45 mm and 80 mm. In general, the distance (46) between the bottom side (45) of the housing (44) for the heating or hob heating and control electronics on the one hand and the bottom side (47) of the fan housing (48) on the other can measure between 60 mm and 100 mm. The distance (49) between the bottom side (47) of the fan housing (48) on the one hand and the bottom side of the floor (42) of the cooking vapor aspiration chamber (39) on the other can measure between 45 mm and 80 mm, for example.

As evident in particular from FIG. 15, two radial fans (38) as viewed from above can be positioned in the fan housing (48) on either side of the tubular foul air line (50) provided downstream from the central hob recess (4). The rotating directions (73) of the two fan wheels (65) of these two radial fans (38) are then preferably opposite to each other. According to FIG. 15, the left fan wheel (65) can be rotatively driven counterclockwise as viewed from above, while the right fan wheel (65) can then be rotatively driven clockwise as viewed from above. In this case, the two pressure chambers (67) of the two radial fans (38) can be adjacent to the central foul air line (50).

The advantage to oppositely aligning the rotational directions (73) according to FIG. 15 is that the two cooking vapor exhaust flows (69) stream toward the odor filter (71) provided downstream from the space (68) for dividing and aligning the exhaust flows (69), either indirectly by way of air guiding surfaces (70), or in a uniformly direct manner.

In particular FIG. 14 shows that, as viewed from above, the central floor area (74) located inside the hollow cylindrical grease filter (6) can be at least somewhat recessed at least in relation to the lateral floors (42) of the two aspiration chambers (39) provided on either side of this central floor area (74), with the formation of a stop (75) for the lower edge area (53) of the hollow cylindrical grease filter (6). The central floor area (74) can further be inclined relative to a central or edge recess (76) so as to collect and trap overflowed liquid. In this case, the operator is provided with especially convenient access to the central floor area (74) for cleaning purposes.

In sum, let it be noted that the present invention provides a hob with a device for removing cooking vapors through suction in a direction lying vertically below the plane of the hob. For the first time ever, a cooking vapor removal device is combined with a hob in the device according to the invention to form a single component, thereby yielding especially low manufacturing and assembly costs.

Since the area of the geometric center (3) of the hob (1) according to the invention exhibits a round or oval or square recess (4) as viewed from above for a device (5) used to remove cooking vapors through suction in a downward direction pointing vertically below the hob (1), the surfaces located on either side and in back of the hob can now for the first time ever be unrestrictedly used on the countertop that carries the hob for temporary storage or similar purposes.

Since the device (5) for the removal of cooking vapors is now centrally provided in the area of the geometric center (3) of the hob (1), sufficiently strong suction flows that do not cancel each other out act on the entire surface of the hob (1). This reliably prevents cooking vapors from rising and expanding in both the central area of the hob and in its edge areas.

Other special advantages to the hob (1) according to the invention have to do with the fact that its manufacturing, assembly, maintenance and operating costs are especially low.

Also advantageous with respect to the hob (1) according to the invention is that the electrical energy going toward suction removal is used especially efficiently, giving the hob (1) according to the invention a particularly high level of efficiency.

Another advantage to the hob (1) according to the invention lies in the fact that the noise generation is very low even during cooking vapor suction removal operation.

With respect to the hob (1) according to the invention designed as an assembly unit with a device (36), let it be noted in summation that its design height is particularly low, so that extensive space is available for unimpeded use in the kitchen structure.

Another special advantage to the hob (1) according to the invention designed as an assembly unit with a device (36) involves its compactness, and the fact that it can be completely preassembled at the factory. As a result, the planning and assembly outlay is especially low.

Finally, the completely preassembled, compact assembly unit must now only be placed in a recess of the countertop, making assembly especially fast, simple and cost-effective.

Figure 17:
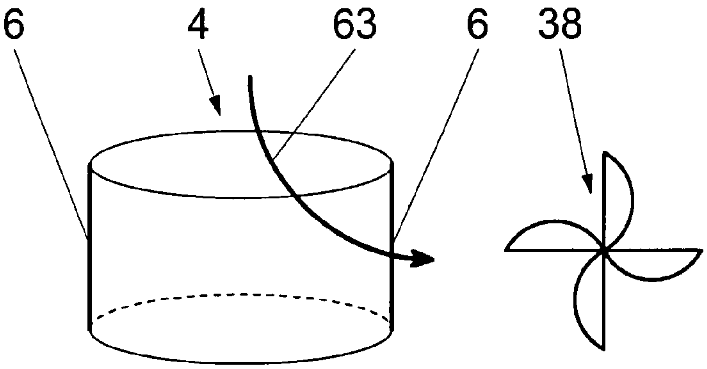
FIG. 17 is a schematic view of a hollow cylindrical grease filter (6), which is connected only with a single foul-air vent (38)
Figure 18:
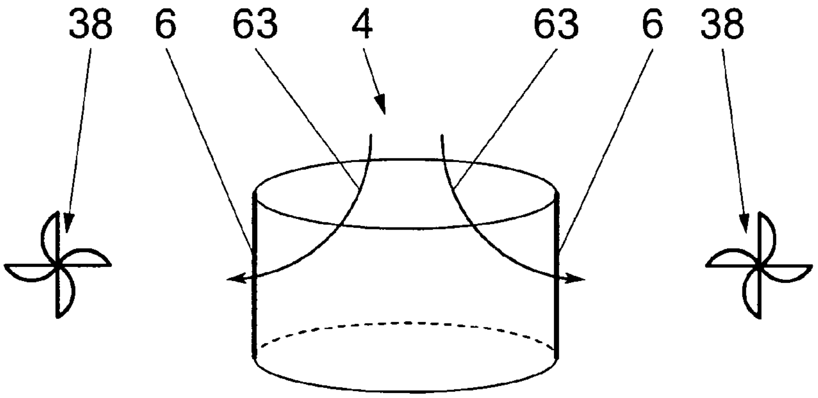
FIG. 18 is a schematic view of a hollow cylindrical grease filter (6), which is connected with two opposing foul-air vents (38).

Providing two or more opposing radial fans (38) downstream from the hollow cylindrical grease filter (6) according to FIGS. 17 and 18 markedly enlarges the working surface of the grease filter (6) and elevates the throughput volume, while at the same time improving the level of grease separation and generating an especially low pressure loss on the larger, effectively active grease filter surface (6). The advantage to this is that the fan motors (56) of the radial fans (38) can exhibit an especially small, energy-saving, energy-efficient and quiet design. In addition, a lower speed can be selected for the fan motors (56), as a result of which the radial fans (38) used according to the invention operate in an especially quiet, low-vibration and energy-efficient manner.

One special advantage to the hob (1) according to the invention designed as an assembly unit with a device (36) is that it offers effective protection against and insensitivity to overflowed liquid that has penetrated through the central recess (4) up to a volume of 5 liters. This is because suspending the fan motors (56) on the floor (45) of the housing (44) for the heating or hob heating and control electronics essentially makes the trough-like volume of the deepest cooking vapor aspiration chamber (39) available for accommodating overflowed liquid, precluding any danger to the fan motors (56).

While specific embodiments of the invention have been shown and described in detail to illustrate the application of the principles of the invention, it will be understood that the invention may be embodied otherwise without departing from such principles.

What is claimed is:

1. An assembly unit, comprising:
- a cooktop having a top surface comprising one or more cooking locations and a central recess;
- a heater housing disposed underneath the cooktop for housing heating components; and
- a cooking vapor removal device disposed below the cooktop and in fluid communication with the central recess to remove cooking vapors through the central recess, the cooking vapor removal device comprising:
  - a grease filter insert insertable into the central recess;
  - a vapor aspiration chamber having a floor;
  - a fan and a fan housing, the fan housing being mounted to a bottom of the heater housing and arranged above the floor of the vapor aspiration chamber such that the fan is laterally offset from the central recess, the fan being configured to transport at least some of the cooking vapors from the vapor aspiration chamber and towards the fan through a lower portion of the fan housing; and
  - an odor filter provided downstream of the fan and behind the central recess.

2. The assembly unit according to claim 1, wherein a distance between a bottom side of the cooktop and a bottom side of the vapor aspiration chamber is between 110 mm and 260 mm, and wherein the assembly unit is configured to be installed in a recess of a countertop.

3. The assembly unit according to claim 1, wherein the fan is a radial fan comprising a fan motor with a vertically aligned rotational axis.

4. The assembly unit according to claim 1, wherein the central recess is round or oval.

5. The assembly unit of claim 1, wherein a distance between the bottom of the heater housing and a bottom side of the fan housing is between 60 mm and 100 mm.

6. The assembly unit according to claim 1, wherein the grease filter insert has a cross section in a shape of a letter U.

7. The assembly unit according to claim 1, wherein the grease filter insert has a lateral wall that has a cylindrical shape.

8. The assembly unit according to claim 1, wherein the grease filter insert has a lateral wall and a floor, and wherein the lateral wall and the floor of the grease filter insert are permeable to cooking vapors.

9. The assembly unit according to claim 1, wherein the vapor aspiration chamber guides the cooking vapors from the central recess, towards the fan through the lower portion of the fan housing, and then through the odor filter.

10. An assembly unit, comprising:
- a cooktop having a top surface comprising one or more cooking locations and a central recess;
- a heater housing disposed underneath the cooktop for housing heating components; and
- a cooking vapor removal device disposed below the cooktop and in fluid communication with the central recess to remove cooking vapors through the central recess, the cooking vapor removal device comprising:
  - a grease filter insert insertable into the central recess;
  - a vapor aspiration chamber having a floor;
  - a fan and a fan housing, the fan housing being mounted to a bottom of the heater housing and arranged above the floor of the vapor aspiration chamber, the fan being configured to transport at least some of the cooking vapors from the vapor aspiration chamber and towards the fan; and
  - an odor filter, the odor filter being separate and distinct from the grease filter insert.

11. The assembly unit according to claim 10, wherein a distance between a bottom side of the cooktop and a bottom side of the vapor aspiration chamber is between 110 mm and 260 mm, and wherein the assembly unit is configured to be installed in a recess of a countertop.

12. The assembly unit according to claim 10, wherein the fan is a radial fan comprising a fan motor with a vertically aligned rotational axis.

13. The assembly unit according to claim 10, wherein the central recess is rectangular.

14. The assembly unit according to claim 10, further comprising:
- a heater housing disposed underneath the cooktop for housing heating components.

15. The assembly unit according to claim 10, wherein the grease filter insert has a lateral wall and a floor, the grease filter insert being permeable to the cooking vapors.

16. The assembly unit according to claim 10, wherein the odor filter is laterally offset from a longitudinal access of the central recess.

17. The assembly unit according to claim 10, wherein the vapor aspiration chamber has a floor that defines a liquid collecting basin, and wherein the liquid collecting basin is configured to be manually drained.

18. The assembly unit according to claim 10, further comprising:

a bladed shutter removably overlying the central recess.

19. An assembly unit, comprising:

a cooktop having a top surface comprising one or more cooking locations and a central recess, the central recess defining a longitudinal axis extending in a vertical direction;

a heater housing disposed underneath the cooktop for housing heating components; and a cooking vapor removal device disposed below the cooktop and in fluid communication with the central recess to remove cooking vapors through the central recess, the cooking vapor removal device comprising:

a grease filter insert insertable into the central recess;

a vapor aspiration chamber having a floor;

a fan and a fan housing, the fan housing being mounted to a bottom of the heater housing and arranged above the floor of the vapor aspiration chamber such that the fan is laterally offset from the central recess, the fan being configured to transport at least some of the cooking vapors from the vapor aspiration chamber and towards the fan through a lower portion of the fan housing; and an odor filter defining a central axis, wherein the central axis of the odor filter and the longitudinal axis of the central recess are noncollinear.

* * * * *